US008738541B2

(12) United States Patent  
Gross (10) Patent No.: US 8,738,541 B2  
(45) Date of Patent: May 27, 2014

(54) METHOD OF PROCESSING RENTAL REQUESTS AND RETURNS

(75) Inventor: John N. Gross, San Francisco, CA (US)

(73) Assignee: Media Queue, LLC, Tulsa, OK (US)

( * ) Notice: Subject to any disclaimer, the term of this patent is extended or adjusted under 35 U.S.C. 154(b) by 841 days.

(21) Appl. No.: 10/874,412

(22) Filed: Jun. 22, 2004

(65) Prior Publication Data

US 2004/0267669 A1  Dec. 30, 2004

Related U.S. Application Data

(60) Provisional application No. 60/482,371, filed on Jun. 25, 2003.

(51) Int. Cl.
*G06Q 20/00* (2012.01)
(52) U.S. Cl.
USPC ................................. 705/77; 705/51; 705/57
(58) Field of Classification Search
USPC .............................................. 705/77, 51, 57
See application file for complete search history.

(56) References Cited

U.S. PATENT DOCUMENTS

| | | | |
|---|---|---|---|
| 4,766,542 A | 8/1988 | Pilarczyk | |
| 5,095,195 A | 3/1992 | Harman et al. | |
| 5,459,306 A | 10/1995 | Stein et al. | |
| 5,664,110 A | 9/1997 | Green et al. | |
| 5,699,526 A | 12/1997 | Siefert | |
| 5,742,757 A | 4/1998 | Hamadani et al. | |
| 5,752,160 A | 5/1998 | Dunn | |
| 5,774,357 A | 6/1998 | Hoffberg | |
| 5,790,426 A | 8/1998 | Robinson | |
| 5,842,199 A | 11/1998 | Miller et al. | |
| 5,861,906 A | 1/1999 | Dunn et al. | |
| 5,884,282 A | 3/1999 | Robinson | |
| 5,901,246 A | 5/1999 | Hoffberg et al. | |
| 5,903,454 A | 5/1999 | Hoffberg | |
| 5,918,014 A | 6/1999 | Robinson | |
| 5,945,987 A | 8/1999 | Dunn | |
| 5,951,643 A | 9/1999 | Shelton et al. | |
| 5,959,945 A | 9/1999 | Kleiman | |
| 5,991,791 A | 11/1999 | Siefert | |
| 6,012,052 A | 1/2000 | Altschuler et al. | |

(Continued)

FOREIGN PATENT DOCUMENTS

| | | |
|---|---|---|
| EP | 0900424 A1 | 10/1999 |
| WO | 0137539 A2 | 5/2001 |

(Continued)

OTHER PUBLICATIONS

Paula Eisenberg; "A Better Way to Get Your DVD Fix," Larchmont Gazette, Aug. 23, 2002, 3 pages.

(Continued)

*Primary Examiner* — Pierre E Elisca
(74) *Attorney, Agent, or Firm* — J. Nicholas Gross, Atty (57) ABSTRACT

A delivery mechanism for distributing media items to subscribers uses a timed based benchmark, or a triggering event, in lieu of or in addition to a conventional capacity driven model. In this manner, subscribers can temporarily have access to a number of titles exceeding a quota in some instances, in order to reduce monitoring requirements, or further some promotional interest. In other instances subscribers are consulted in advance before new titles are delivered, to give them an option of selecting their choice or a choice made automatically for them by a recommender system.

31 Claims, 3 Drawing Sheets

Time Based Automatic Title Shipping (56) References Cited

U.S. PATENT DOCUMENTS

| | | | |
|---|---|---|---|
| 6,016,475 A | 1/2000 | Miller et al. |
| 6,026,403 A | 2/2000 | Siefert |
| 6,029,161 A | 2/2000 | Lang et al. |
| 6,041,311 A | 3/2000 | Chislenko et al. |
| 6,049,777 A | 4/2000 | Sheena et al. |
| 6,055,505 A | 4/2000 | Elston |
| 6,065,042 A | 5/2000 | Reimer |
| 6,067,562 A | 5/2000 | Goldman |
| 6,092,049 A | 7/2000 | Chislenko et al. |
| 6,108,493 A | 8/2000 | Miller et al. |
| 6,112,186 A | 8/2000 | Bergh et al. |
| 6,169,997 B1 | 1/2001 | Papierniak et al. |
| 6,236,985 B1 | 5/2001 | Aggarwal |
| 6,237,022 B1 | 5/2001 | Bruck et al. |
| 6,253,203 B1 | 6/2001 | O'Flaherty et al. |
| 6,266,649 B1 | 7/2001 | Linden et al. |
| 6,286,139 B1 | 9/2001 | Decinque |
| 6,289,389 B1 | 9/2001 | Kikinis |
| 6,308,168 B1 | 10/2001 | Dovich et al. |
| 6,317,722 B1 | 11/2001 | Jacobi et al. |
| 6,321,221 B1 | 11/2001 | Bieganski |
| 6,334,127 B1 | 12/2001 | Bieganski et al. |
| 6,381,250 B1 | 4/2002 | Jacobson et al. |
| 6,389,372 B1 | 5/2002 | Glance et al. |
| 6,400,996 B1 | 6/2002 | Hoffberg |
| 6,405,191 B1 | 6/2002 | Bhatt et al. |
| 6,412,012 B1 | 6/2002 | Bieganski et al. |
| 6,418,424 B1 | 7/2002 | Hoffberg et al. |
| 6,426,959 B1 | 7/2002 | Jacobson et al. |
| 6,480,855 B1 | 11/2002 | Siefert |
| 6,484,123 B2 | 11/2002 | Srivastava |
| 6,487,541 B1 | 11/2002 | Aggarwal et al. |
| 6,496,816 B1 | 12/2002 | Thiesson et al. |
| 6,502,096 B1 | 12/2002 | Siefert |
| 6,513,017 B1 | 1/2003 | Howard et al. |
| 6,539,281 B2 | 3/2003 | Wan et al. |
| 6,584,450 B1 * | 6/2003 | Hastings et al. | 705/26.1 |
| 6,591,094 B1 | 7/2003 | Bentley |
| 6,640,145 B2 | 10/2003 | Hoffberg |
| 6,714,931 B1 | 3/2004 | Papierniak et al. |
| 6,826,560 B1 | 11/2004 | Leymann et al. |
| 6,874,023 B1 | 3/2005 | Pennell et al. |
| 6,910,070 B1 | 6/2005 | Mishra et al. |
| 6,981,003 B2 | 12/2005 | Pauliks et al. |
| 7,085,727 B2 | 8/2006 | VanOrman |
| 7,130,814 B1 | 10/2006 | Szabo et al. |
| 7,324,961 B2 | 1/2008 | Al-Azzawe |
| 7,403,910 B1 | 7/2008 | Hastings et al. |
| 2001/0036271 A1 | 11/2001 | Javed |
| 2002/0023165 A1 | 2/2002 | Lahr |
| 2002/0040404 A1 | 4/2002 | Lahr |
| 2002/0154157 A1 | 10/2002 | Sherr et al. |
| 2002/0165849 A1 | 11/2002 | Singh et al. |
| 2002/0184105 A1 | 12/2002 | Czuchry et al. |
| 2003/0005428 A1 | 1/2003 | Roman |
| 2003/0233278 A1 | 12/2003 | Marshall |
| 2004/0215733 A1 | 10/2004 | Gondhalekar et al. |
| 2005/0086127 A1 * | 4/2005 | Hastings et al. |

FOREIGN PATENT DOCUMENTS

| | | |
|---|---|---|
| WO | WO01/46930 | 6/2001 |
| WO | WO01/60063 | 8/2001 |
| WO | WO01/88761 | 11/2001 |

OTHER PUBLICATIONS

Michael Gunde, et al.; "Southern Conference of Librarians for the Blind and Physically Handicapped," DIKTA, vol. XIII, No. 2, 1991, 8 pages.

Anonymous; "Beyond 2000: Books, Bytes and Beginnings," Agency Strategic Plan Fiscal Years 2001-2005, Texas State Library and Archives Commission, http://web.archive.org/webI200112170410 16/www.ts1.state.tx.ns/pubs/st., 2001, 46 pages.

Dale Propp; "Access Self-Study," Texas State Library, vol. 7, Dec. 15, 1987, 14 pages.

Judith Wanger, et al.; "Automated Circulation Systems in Libraries Serving the Blind and Physically Handicapped: A Reference Guide for Planning," Cuadra Associates, Inc., May 15, 1981, 292 pages.

Anonymous; "New York State Talking Book and Braille Library," http://web.archive.org/web/2002081720 1412/www.nysl.nysed.gov/tbbl/t, 2002, 13 pages.

Jean D. Anderson; "The New York State Library for the Blind and Visually Handicapped Automated Circulation System," The University of the State of New York, 1978, 42 pages.

Susie Adams, et al.; "BizTalk Unleashed," Sams Publishing, 2002, 5 pages.

Peter Konshak; "Coding a Custom Alert Service," Computers in Libraries, Feb. 2001, 4 pages.

Anonymous; "E-Commerce Inventory Management System Offers Unprecedented Solution for Cost Savings," Business Wire, Jul. 20, 2000, 2 pages.

Gregory Wasson; "PowerAGENT," MacUser, Feb. 1, 1995, 2 pages.

John Webster; "SOAP May Help Automate B2B," InternetWeek, Jan. 15, 2001, 2 pages.

Martin Skold; "Active Database Management Systems for Monitoring and Control," Linkoping Studies in Science and Technology Dissertation No. 494, 1997, 312 pages.

David W. McKeown, et al.; "Triggers for object-oriented database systems," Journal of Object-Oriented Programming, May 1997, 8 pages.

John R. Miller, et al.; "Automating Residence Hall Internet Signups," SIGUCCS 2000, 5 pages.

Eric N. Hanson, et al.; "A flexible and recoverable client/server database event notification system," The VLDB Journal (1998) 7: 12-24.

Bill Dedman; "E-Mail Alerts Show Growing Potential," NY Times, Feb. 9, 1998, 2 pages.

Anonymous; "INCOMNET launches new Euro-style prepaid calling card," Business Wire, Oct. 15, 2003, 2 pages.

Anonymous; "Libraries & Literacy Libraries consider needs of community," The Globe and Mail (Canada), Jun. 4, 1993. 2 pages.

Eric N. Hanson; "Support of Intelligent Integration of Information Using an Asynchronous Trigger Processor," AFRL-IF-RS-TR-2000-72 Final Technical Report, Jun. 2000, 57 pages.

Anonymous; "Georgia Regional Library for the Blind & Physically Handicapped," http://web.archive.org/web120010603032749/www.public.lib.ga.us/lbph/, 1997, 7 pages.

Anonymous; "The Andrew Heiskell Library for the Blind and Physically Handicapped," http://web.archive.oqifweb/20020804061148/1blpac.nypl.org/ cgi -bin/we, 2002.

Anonymous; "Siebel 7.5 Integration BMC Software PATROL for Siebel eBusiness Applications 3.0," Siebel Systems, Inc., 2002, 2 pages.

Current Press Releases, "Online Rental Service Netflix Surpasses 600,000 Subscribers," http://www.netflix.com, Apr. 23, 2002, 1 page.

Current Press Releases, "Boost in Holiday DVD Sales Pushes Netflix Over 500,000-Subscribers," http://www.netflix.com, Feb. 12, 2002, 2 pages.

Current Press Releases; "It's a 'Winter-ful' Life With Movies in Your Mailbox," http://www.netflix.com, Jan. 8, 2002, 2 pages.

Current Press Releases; "Netflix launches 'all you can watch' DVD rental program," http://www.netflix.com, Feb. 14, 2000, 2 pages.

Marc Matsumoto.; Miscellaneous emails regarding Netflix, dated Jul. 7, 2002, 9 pages.

Netflix Media Center; "NETFLIX.com Transforms DVD Business Eliminating Late Fees and Due Dates From Movie Rentals," http://netflix.mediaroomcom/index.php?s=43&itellF231, Dec. 16, 1999, 2 pages.

Arlene Weintraub; "Netflix' Pix Beat Mortar and Bricks," Business Week, May 16, 2002, 2 pages.

Benny Evangelista; "Movies by mail Netflix.com makes renting DVDs easy," SFGate.com, Jan. 26, 2002, 3 pages.

Sean Popen; "We've Received: East/West (2000)—Rate It Now!," email dated May 21, 2001, 1 page.

Marc Matsumoto, et al.; Miscellaneous emails regarding Netflix, dated Jul. 6-8, 2002, 169 pages.

(56) References Cited

OTHER PUBLICATIONS

Google Groups; "Nine Queens not playable on Toshiba . . . any others?," http://groups.google.com/group/alt.video.dvdlbrowse_thread/threadl191212068d27f9fb?.., Nov. 18-23, 2002, 3 pages.

Google Groups; "Netflix—Strange message," http://groups.google.com/group/alt.video.dvd/browse_thread/thread/c6fe274e039aa9f8?h., Apr. 18, 2000, 1 page.

Sean Popen; "Shipped: Dragonheart: A New Beginning (2000)," email dated May 24, 2001, 1 page.

Current Press Releases; "Make Your Wish List and Check it Twice—Netflix Delivers Your DVDs Whether You're Naughty or Nice!," http://netflix.mediaroomcom/index.php?s=43&itellF135, Oct. 30, 2001, 2 pages.

Netflix press release, "Personalized Movie Recommendor Provides Netflix Visitors With Highly Accurate Film Recommendations Based on Their Individual Movie Taste History," Jan. 25, 2000, 2 pages.

Schwartz, S.K.; CD Clubs: a sound deal? located at <http://money.cnn.com/1999/12/01/life/q_music/>, Dec. 1, 1999, 5 pages.

Hastings, Reed et al., "Approach for Renting Content," U.S. Appl. No. 60/244,793, filed Oct. 31, 2000, 9 pages.

Ciancutti, John et al., "Approach for Choosing Items to Recommend Based Upon Matching Taste Across Multiple Users and Items," U.S. Appl. No. 60/212,193, filed Jun. 16, 2000, 15 pages.

Dana, James D. et al., "Revenue Sharing and Vertical Control in the Video Rental Industry," Department of Management and Strategy, J. L. Kellogg Graduate School of Management, Evanston, IL 2001, 36 pgs.

Ostrum, Mary Anne, "With newer releases, Netflix users can anticipate a 'very long wait'," The Mercury News: http://www.siliconvalley.com/mld/siliconvalley/3614404.htm, posted Jul. 6, 2002, 2 pgs.

O'Brien, Jeffrey M., "The Netflix Effect," Wired Magazine, Issue 10.12 Dec. 2002, 5 pgs.

DVD Avenue webpage, http:/_/www.dvdavenue.com/?AID=6246759&PID=1244714, Jan. 29, 2003, 2 pgs.

Qwikfliks webpage, http:/_/www.qwikfliks.com/xgenesis.asp, Jan. 29, 2003, 2 pgs.

Qwikfliks webpage, http:/_/www.qwikfliks.com/cookies_req.asp Jan. 29, 2003, 1 page.

E-Business Strategies, Inc., "Netflix: Transforming the DVD Rental Business," 2002, 10 pgs.

Dvd_rent_test@hotmail.com, "An Analysis of Netflix's DVD Allocation System," http:/_/dvd-rent-test.dreamhost.com, Apr. 22, 2003, version 1.0, 8 pgs.

DVD Barn webpage, http:/_/www.dvdbarn.com/index.dvd, Jan. 29, 2003, 2 pgs.

Order Granting/Denying Request for Inter Partes Reexamination for U.S. Patent 7,389,243, Control No. 95/000,469, mailed Dec. 1, 2009, 25 pages.

\* cited by examiner

Fig. 2

Trigger Based Automatic Title Shipping

METHOD OF PROCESSING RENTAL REQUESTS AND RETURNS

RELATED APPLICATION DATA

The present application claims the benefit under 35 U.S.C. 119(e) of the priority date of Provisional Application Ser. No. 60/482,371 filed Jun. 25, 2003, which is hereby incorporated by reference.

FIELD OF THE INVENTION

The present invention relates to electronic commerce systems and methods of providing selections, shipments and exchanges of rental items. The invention has particular applicability to applications in which entertainment media are rented on a temporary or short term basis by subscribers over the Internet.

BACKGROUND

The Internet is now being used for a number of commercial purposes, including purchase and rental of movie films in different media formats. One such popular website is maintained by Netflix®, where subscribers can search, review and select movie titles (in DVD media format). If a particular title is available, the subscriber's choice is then placed into a rental selection "queue." During an interactive online session, a subscriber can select a number of titles, and then prioritize them in a desired order for shipment within the selection queue.

After the movie title selection session is over, the system proceeds to ship the desired tides in the order requested by the subscriber. The selections are mailed to the user in special packaging, which include return mailers pre-printed and adapted for such movie media. This minimizes the inconvenience to the subscriber, but there is an indeterminate processing and mailing delay therefore associated with each selection. In most instances, a selection is mailed the same day, but even in such cases, there is typically a three day transaction period associated between the selection, processing, shipment, mail transit and receipt of a particular title.

After shipment, these titles then appear in a list identified essentially as items that are outstanding (i.e., movies that have not yet been returned by the user) within a "titles out" queue. Under one option of the Netflix terms of service, the system places a limit on the number of outstanding titles that a subscriber may have at any one time (typically, a function of the level of service agreement, with more $$/month resulting in more titles). Thus, if the user selects more movies than they can acquire at one time, the remaining movie titles remain as un-shipped items in the rental selection queue. Additional titles in the rental selection queue are only shipped to the user after the system logs a returned item from that same user. This happens automatically, so the user does not need to return to the Netflix website to request the shipment. At the same time, however, the user is not consulted in the decision to ship the next item; it happens without his/her approval or advance notice.

The aforementioned system is further described in U.S. Pat. No. 6,584,450, which is hereby incorporated by reference. The '450 patent explains the above policy in terms of a "MAX" out approach for servicing rental customers. Notably, the aforementioned disclosure also mentions that the MAX out approach can only be altered under certain exceptions, such as where the customer agrees to pay a surcharge.

A limitation of the aforementioned system is that while the system automatically ships the next items in the rental queue it fails to consider whether the user may in fact want to "veto" the next item in the queue, either because their tastes have changed, or if they might have already seen the title. As users sometimes fill up their request queues months in advance with dozens of titles, and they typically only see 6-8 movies per month, there is a strong possibility that one more of such titles will be stale after several months.

A further limitation, of course, is that the user must always return another title before the next title in their queue is shipped to them. While this is somewhat useful for inventory tracking purposes, the user is handicapped by the fact that after they posit the returned title in the mail, they have little or no control over how quickly or accurately such return will be processed by the mail, or the rental service.

Finally, it is conceivable that on many occasions, from the perspective of the service provider, it will be desirable to ship another title to a customer, regardless of a status of their delivery queue, and without applying a surcharge. In other words, in order to promote certain titles, retain certain customers, or balance supply/demand, a service provider may want to automatically ship more than the "Max Out" figure to a particular customer, based on some triggering event.

SUMMARY OF THE INVENTION

An object of the present invention, therefore, is to overcome the aforementioned limitations of the prior art.

Another object is to implement a method of delivering rentals which allows users to be part of the process of determining which titles they should receive;

A further object is to implement a method of delivering rentals which is based on an automatic, time based delivery for rental titles, and not on a returned/received status of other rental titles in the customer's possession;

Yet another object is to implement a method of delivering rentals which is based on automatically selecting titles of interest for the customer using a recommendation system, and using such criteria, rather than user specified criteria, for automatically shipping items to a user.

A first aspect of the invention, therefore, concerns a method of delivering rented media to a subscriber comprising the steps of: providing a maximum number of media items (Nmax) which the subscriber can have out at any moment in time; delivering a media item to the subscriber in accordance with a priority specified by the subscriber; incrementing a count of media items out (Nout); determining if $Nout>=Nmax$; when $Nout>=Nmax$, setting a timer to a predetermined delay; delivering another media item to the subscriber after expiration of said predetermined delay, even if $Nout>=Nmax$. In this fashion, a number of media items in excess of Nmax can be in the subscriber's possession and/or in transit to/from the subscriber.

Thus, in preferred embodiments, distributions of media items to subscribers are provided at least partially on a time basis, and not on a subscriber capacity basis. This allows for more flexibility in reducing returns monitoring. When $Nout=Nmax+1$, returns from the subscriber are then monitored to identify if Nout should be decremented. Typically the media items are DVDs or other entertainment content identified in a delivery queue by the subscriber, ordered in a sequence of desired receipt by the subscriber.

In some embodiments a delinquency period for the subscriber is monitored, which delinquency period is a period of time in which $Nout>=Nmax$ for the subscriber. Depending on how tardy a particular subscriber is, automatic timed deliveries can be suspended. Further still, in some instances, the predetermined delay can be function of how many titles are out, when a prior title was delivered to the subscriber, or demand for the media item.

Another aspect of the invention covers a method of delivering rented media to a subscriber comprising the steps of: providing a maximum number of media items (Nmax) which the subscriber can have out at any moment in time; delivering a media item to the subscriber in accordance with a priority specified by the subscriber; incrementing a count of media items out (Nout); determining if Nout>=Nmax; determining if an overcapacity triggering event has occurred; delivering another media item to the subscriber after expiration of said predetermined delay, even if Nout>=Nmax. Again, a number of media items in excess of Nmax can be in the subscriber's possession and/or in transit to/from the subscriber.

In typical environments, the overcapacity triggering event can be one or more of the following: a promotion for the media item, a demand associated for the media item, a timer associated with the subscriber, a recommender system prediction given for the subscriber, or a status of a delivery queue maintained for the subscriber.

Still another aspect of the invention concerns a method of delivering rented media to a subscriber comprising the steps of: providing a maximum number of media items (Nmax) which the subscriber can have out at any moment in time; delivering a first media item to the subscriber; monitoring returns from the subscriber and a delivery capacity for the subscriber to identify if a second media item should be sent to the subscriber; selecting at least two candidate media items by choosing a first title identified by the subscriber and a second title automatically selected for the subscriber based on preferences of the subscriber; presenting said at least two candidate media items to the subscriber to permit such subscriber to select which one should be delivered next in sequence. Thus, the subscriber is consulted before said second media item is sent.

In preferred embodiments, the media are rented over the Internet, and the subscriber is consulted by email. To assist the subscriber in identifying suitable candidate items, the subscriber is directed to a website to select from additional candidate media items. The second titles are preferably selected by a recommender system operating at an Internet site.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. While described in the context of a rental system, it will be apparent to those skilled in the art that the present teachings could be used in any Internet based rental or purchase system that employs a queue of some form.

DETAILED DESCRIPTION

While the present preferred embodiment is directed to a process to be used by a rental service for distributing DVD movie titles, it will be understood by those skilled in the art that, as used herein, the term "media item" or "playable media item" is intended to have its broadest meaning to include any machine readable media readable (including software programs) by a subscriber machine player (such as a DVD player, a computer, a video recorder/receiver, an audio CD ROM Player, and the like). In addition, electronic files which are downloaded and/or streamed from the Internet or some other distribution point (Satellite, Cable) are also encompassed in this definition. Furthermore, other queable content/items that are not machine readable could be distributed in this fashion as well, including human readable materials such as printed matter in the form of books, magazines, and other general purpose items. Other useful articles can be rented and distributed in accordance with the present teachings as well.

Figure 1:
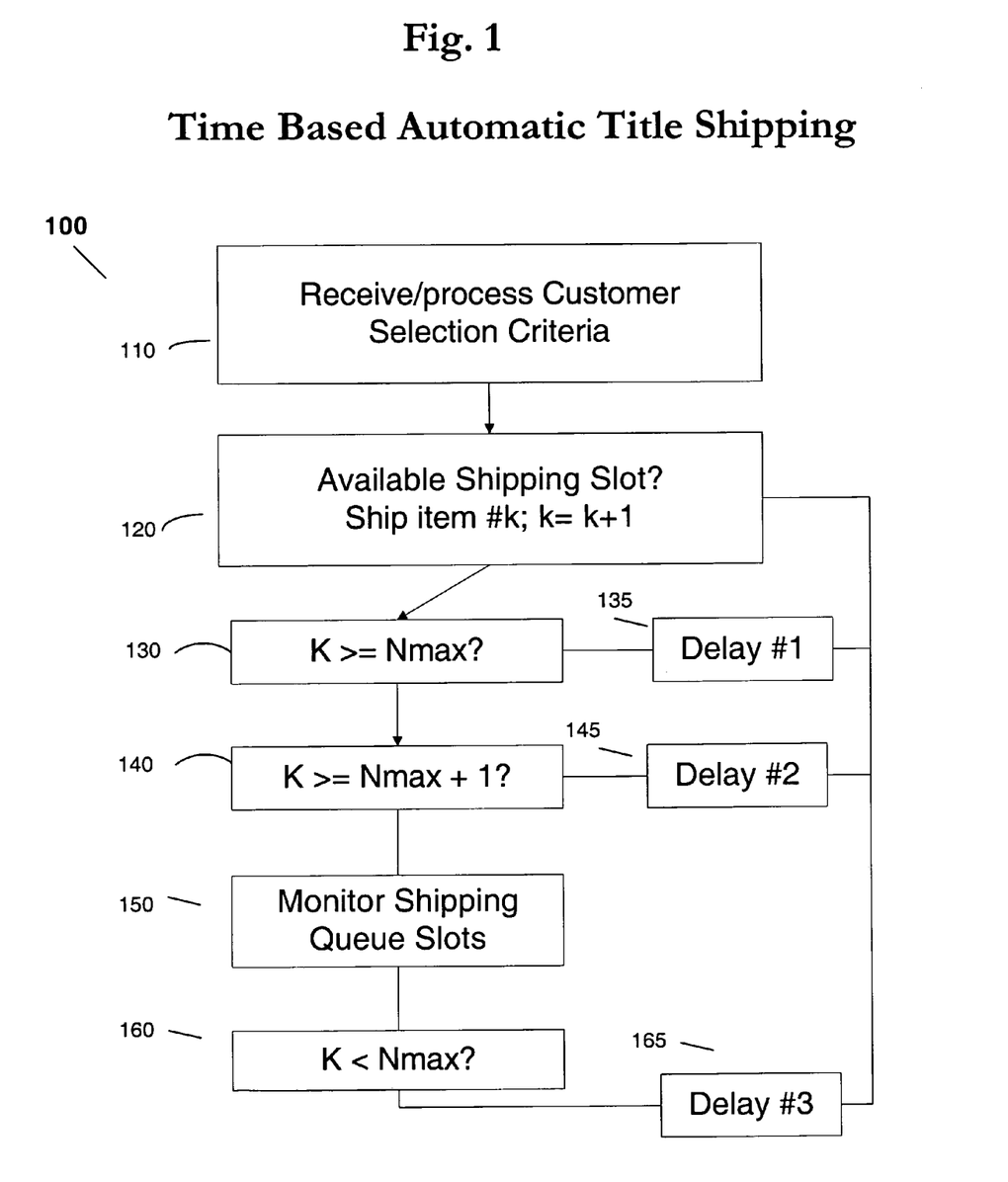
FIG. 1 illustrates a first embodiment of a time based rental title shipping/return process implemented in accordance with the present invention.

FIG. 1 illustrates an example of a rental shipping/return process 100 employed in the present invention that is based primarily on a time-based delivery approach. The process shown in FIG. 1 can be implemented, for example, in a rental service of the type operated online by Netflix and other companies as noted above.

As seen in FIG. 1, a first step 110 of the process concerns collecting customer selection criteria. This, again, can take the form of the criteria gathered by the system noted in the aforementioned U.S. Pat. No. 6,584,450, and in the manner described therein. For example, as noted in such disclosure, a rental provider could collect data on a type of service agreement required by the customer—including a desired maximum number of titles that can be "out" in the customer's possession (Nmax), the names of particular titles, a desired shipping order for such titles, etc. Other examples will be apparent to those skilled in the art. Typically this data is collected through a web browser operating on a client device used by the customer.

At step 120, the system begins shipping titles to the customer, if a slot is available in his/her shipping queue. Assume that K represents the net sum of titles that are out to the customer, accounting for returns, that the user has a free slot in their delivery queue, and that they have selected a title that is otherwise available for shipping. If K<Nmax, the title is shipped, and afterwards, the system increments the counter of titles out to the customer, to reflect that K=K+1.

From there, at step 130, a determination is made if K>=Nmax. According to the prior art above, no further titles would be sent to the customer, unless the customer agrees to a surcharge, or until he/she returns a title. In the present invention, however, an additional title is automatically sent out after a fixed time delay set at step 135, or in accordance with other triggering events identified below. It will be noted, of course, that this time delay can be designed in accordance with the needs of an inventory management system, and in a manner that does not result in an excessive number of titles being shipped unnecessarily. For example, the delay could be set to 1 day, 2 days, or even hours.

The important distinction is that no monitoring need be done for returns by the customer between steps 130 and 135. In other words, the present invention automatically ships another title, even past the "max out" limit, based on a time event, and not a customer originated event (i.e., such as a return of a title, or a receipt of a title).

After step 135, a check can be made, if desired for returns made by the customer. If so, a slot is opened in the subscriber's shipping queue, K is decremented accordingly, and the process continues again at step 120.

At step 140, a check is made to see if in fact the number of titles out the customer K=Nmax+1. If not, a second delay is again introduced at step 145; it will be appreciated that this second delay could be the same or different as the first delay above. The process then proceeds to step 120 as noted earlier.

If at step 140 K is indeed=Nmax+1, the system then moves into a monitoring mode at step 150, wherein the shipping queue is examined for the customer's account to see if there is an available slot. If a return is made, a slot is opened, so that once K<Nmax, another title is shipped in response to an expiration of a third timer delay at step 165.

It will be noted that the above approach, of course, varies from the prior art, in that it is possible, of course, to ship an additional title beyond that contractually requested to the subscriber. It is possible, as well, that the subscriber may "sit" on the titles. Nonetheless, given that the aforementioned rental systems operate by incentivizing customers to exchange inventory, it is unlikely that a subscriber will be motivated to simply sit on an extra title that they did not bargain for. In other words, customers are aware that they cannot get new titles without exchanging older titles, so they are not going to handicap their own potential monthly "turn" of titles by sitting on some set number of titles that is in excess of their limit. It is also perhaps more efficient to separate the returns and shipping processes, so that the programming complexity and monitoring is reduced.

Furthermore, in many cases, of course, it is possible that a title will be shipped out in the morning, while a return is processed from the user later that day. In this respect, the increase in "turns" is rather minimal, since the exchange would occur on that day anyway. Even in cases where the expected "turn" is accelerated by a day or two, there may be other commercial advantages in preemptively shipping a title in an automated fashion according to a fixed schedule.

The primary point, as noted above, is to de-couple the events of a rental return and a rental shipment, and to make the deliveries/shipments of titles caused by a time based event, rather than on monitoring and logging an additional event. The time based event, as well as the amount of the delay can be tailored on an application by application basis, depending on the characteristics of the subscribers, the type of inventory, etc. If a subscriber returns a title before the delay has expired (i.e., the slot opens up, it is not necessary to account for the return anyway, and the present invention presents no worse penalty than the prior art.

In another variation, an additional check can be made at step 140, to see if the subscriber is someone who makes a habit of retaining more than their allotted number of titles. If such person has had more than their allotment during the past N days (where N can be a billing cycle) the system may "veto" the extra shipment, and simply fall through to step 150. Alternatively, the delay for such person could be set longer.

In yet another variant, the time delay could be set to be a function of the number of the title, so that there is only a small delay in shipping the second title, and a larger delay in shipping the last or extra title. Another approach, of course, is to tie the delay for the Nmax+1 title to some fixed time after the shipment of the earliest one shipped to the customer, again, on the expectation that the user is very likely to return the earliest title within such time frame.

In some cases, of course, it may be desirable to only send low-demand titles, or promotional titles as the Nmax+1st title. These may not have been specifically requested by the customer. The advantage of such titles is that they can supplant a subscriber's request for a potentially more valuable or popular title.

As noted herein, such return/shipping process is expected to be embodied in a variety of software programs, routines, etc., that run on one more servers coupled to the Internet. In other embodiments these programs and routines will run directly on a computing machine at the subscriber's premises, such as a digital video recorder, receiver, etc.

Figure 2:
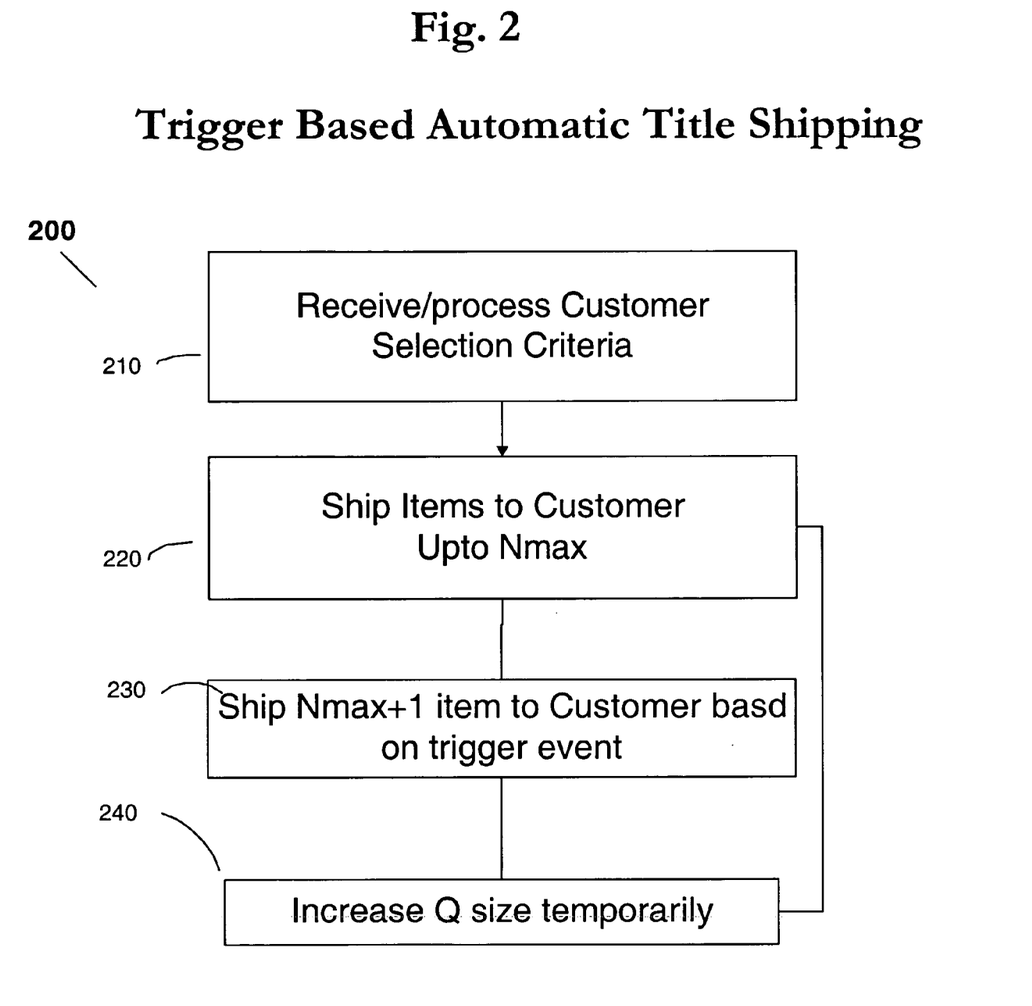
FIG. 2 illustrates a second embodiment of a trigger-based rental title shipping/return process implemented in accordance with the present invention.

FIG. 2 illustrates a second example of a rental shipping/return process 100 employed in the present invention that is based primarily on a trigger event based delivery approach. The process shown in FIG. 2 can be implemented, for example, in a rental service of the type operated online by Netflix and other companies as noted above.

As with step 110 above, step 210 collects customer item selection criteria.

As with step 120 above, step 220 ships a new title if a slot is available.

At step 130, an additional title (beyond the customer's maximum allotment Nmax) is shipped, based on a "triggering event." The triggering event may be an expiration for a timer, a promotion for a particular title, a prediction that the customer will desire the title, and/or a determination made based on observing a status of a customer's queue.

In the promotional case, the title may be a low demand title, a promotional title, etc., which "costs" little to the service provider, and helps to increase the subscriber satisfaction.

In the last case, for example, the system may note that the customer has selected a number of titles which have long waits. Rather than the user seeing nothing for long periods of time (because no titles will be delivered if they are unavailable), the system can, using its own criteria (separate from the user collected criteria) select a title and automatically ship it to the customer.

Again, this is preferably done without a surcharge. The user's shipping queue is thus expanded (albeit temporarily) at step 240.

While the Netflix system is known to "randomly" send additional titles to customers, in excess of their maximum allotment, the applicant does not believe that such system operates based on a promotional event, or on monitoring the customer's queue. The advantage of this approach, as well, is that the system can "throttle" and control demand for new releases. That is, the system can preemptively send titles to a subscriber that are not as high in demand as the titles already in a subscriber's queue. Again, the cost in sending another title may be less than the cost of securing a very popular title, or not satisfying another customer with such title.

Furthermore, an ancillary benefit to the service provider is that they can determine, from available inventory, particular titles which may be of interest to subscribers, and ship them as a way of "filling" subscriber needs in advance. This can be done, again, by auto-recommender systems, such as by the Cinematch system employed by Netflix, or other comparable system. In other words, every title preemptively shipped by the service provider acts to supplant a subscriber choice that may be harder to satisfy (i.e., because the desired title is scarce). For example, if the service determines that a customer is highly likely to enjoy title A, and if the title is shipped to the subscriber, this fills an available spot in the shipping queue and reduces the expectation/opportunity by the subscriber of receiving another (potentially more popular) title. This further frees up an opportunity for the service provider to ship the more popular title to another subscriber, thus giving more flexibility in responding to demand. Furthermore, a service provider can determine which titles have a higher profit margin (i.e., lower sharing expenses with distributors, studios, etc.) and control the distribution of titles more closely using cost/profit as an additional factor as well.

Figure 3:
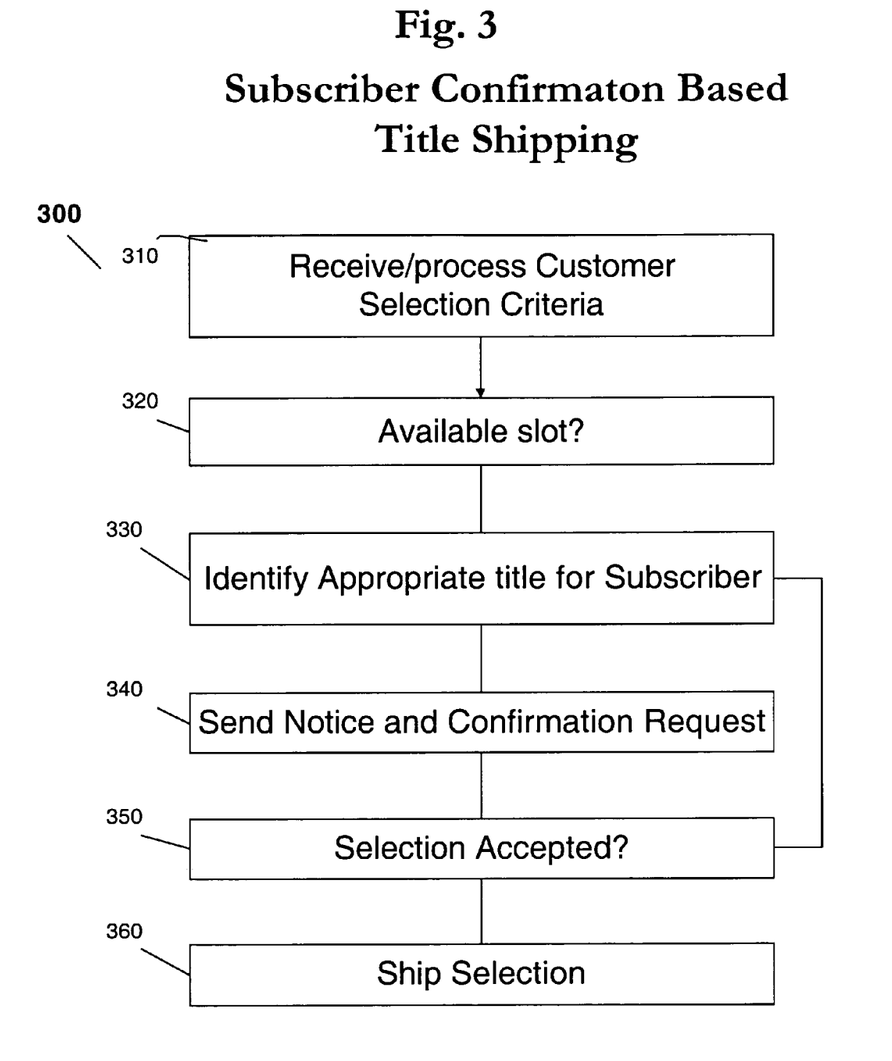
FIG. 3 illustrates a third embodiment of a subscriber controlled rental title shipping/return process implemented in accordance with the present invention.

FIG. 3 illustrates a third example of a rental shipping/return process 100 employed in the present invention that is based primarily on a customer acceptance event based delivery approach. The process shown in FIG. 3 can be implemented, for example, in a rental service of the type operated online by Netflix and other companies as noted above.

As with step 110 above, step 310 collects customer item selection criteria.

At step 320 a determination is made to see if there is an available shipping slot in the subscriber's queue. Assuming there is, at step 330, the system then determines an appropriate title that should be moved into the customer's shipping queue and send to the subscriber.

Unlike the prior art, however, the title is not shipped automatically, simply because the customer has returned another title. Instead, at step 340, a notification is made to the subscriber, by email or otherwise, alerting them to the selected choice that will be sent to them next. In some cases, of course, the selected choice may simply be the next item in the customer's queue, in the order they presented it. In other instances, however, the system can automatically select a new title, and present it to the subscriber for acceptance. Thus, in the latter case, the "selection criteria" are provided by the rental provider system, and not by the subscriber. In some instances, both a user-specified title and a rental provider specified title can be identified, so that the user can make a choice between the two. The user can elect, through the selection criteria entered at step 310, to what extent they wish to have the system make such recommendations.

The notification/confirmation request provided at step 340 is then ratified at step 350. The ratification by the subscriber can take a variety of forms, some of them explicit (i.e., responding "yes" to an email) or implicit (i.e., not providing an objection to the choice within a designated time period). In some cases, a subscriber may set up such notification controls in advance, so that the system always makes a selection on their behalf without further prompting. Other forms will be apparent to those skilled in the art. The distinction, again, is that the system incorporates the subscriber's desires in the shipping process, and does not mechanically decide to ship the next title without first consulting with the customer.

Thus, an acceptance at step 350 may be an actual or "constructive" confirmation. An actual confirmation would require, for example, that the subscriber either visit the site to remove a tentative designation, or confirm the shipment in a later e-mail, etc. A constructive confirmation can be based on time, for example, so that the system will automatically ship the title unless the subscriber objects to such selection within a predetermined (controlled by the user) number of days/hours.

In another instance, the subscriber can be presented with a set of alternatives, or be directed to the website to select another option different from the default choice that would otherwise be sent. This, again, can be used to increase traffic to a provider site, by exposing the subscribers to new materials that they may be unaware of since their last visit.

This approach also has an advantage in that the service provider can also intervene, and automatically recommend a title to be shipped to the subscriber, in lieu of the choice (i.e., the next in the queue) made by the subscriber. A variety of artificial intelligence, or preference determination systems are known in the art for predicting preferences of individuals. These systems work based on such simple factors as demographics, prior selections, expressed preferences, questionnaires, etc.

In the present system, an auto-recommend feature can be based, for example, on prior ratings given by a subscriber to certain movies which he/she has seen, and/or just based on the identity if all prior rentals. In this instance, the system uses prior ratings by default, as these tend to more accurately reflect a particular individual's tastes. However, the invention is by no means limited to any particular mechanism, and it will be understood that any suitable system can be employed for this purpose. The only criterion, of course, is that recommender should work in the background, seamlessly and without extensive burdensome participation by the subscriber so that the queue is automatically replenished.

The above process, notification and acceptance procedures, etc., can all be easily implemented by skilled artisans in a hardware/software form suitable for execution on an online service provider system.

Again, using the present invention, the system is allowed to use a customer acceptance, and/or its own selection criteria, rather than a receiving event, to control shipping of titles. This provides additional advantages, including the fact that titles selected and shipped by the service provider in this fashion act to supplant a subscriber choice that may be harder to satisfy (i.e., because the desired title is scarce). For example, if the service determines that a customer is highly likely to enjoy title A, if the subscriber agrees to select tide A, and if the title is shipped to the subscriber, this fills an available spot in the shipping queue and reduces the expectation/opportunity by the subscriber of receiving another (potentially more popular) title. This further frees up an opportunity for the service provider to ship the more popular title to another subscriber, thus giving more flexibility in responding to demand. Furthermore, a service provider can determine which titles have a higher profit margin (i.e., lower sharing expenses with distributors, studios, etc.) and control the distribution of titles more closely using cost/profit as an additional factor as well.

Finally, it should be noted that this type of proactive inventory management helps to expand the reach and desirability of the system to other types of would-be renters, including persons who are too busy, lazy, or unable to determine appropriate choices on their own. Moreover, since some renters are impulsive, they can be presented automatically with title choices to increase their participation rates as well.

It will be understood by those skilled in the art that the above are merely examples of processes for a media distribution system, and that countless variations on the above can be implemented in accordance with the present teachings. A number of other conventional steps that would be included in a commercial application have been omitted, as well, to better emphasize the present teachings.

Furthermore, it will be apparent to those skilled in the art that the processes of the present invention, including those illustrated in FIGS. 1-3 can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention.

What is claimed is:

1. A method of delivering rented machine readable media to a subscriber comprising the steps of:
providing a maximum number of machine readable media items (Nmax) which the subscriber can have out at any moment in time;
delivering a machine readable media item to the subscriber in accordance with a priority specified by the subscriber to a computing system;
incrementing a count of machine readable media items out (Nout) at the computing system;
determining if Nout>=Nmax at the computing system;
when Nout>=Nmax, setting a timer to a predetermined delay at the computing system; and
delivering another machine readable media item to the subscriber after expiration of said predetermined delay, even if Nout>=Nmax;
wherein a number of machine readable media items in excess of Nmax can be in the subscriber's possession and/or in transit to/from the subscriber.

2. The method of claim 1, wherein distributions of machine readable media items to subscribers are provided at least partially on a time basis by the computing system, and not solely on a subscriber capacity basis.

3. The method of claim 1, wherein when Nout=Nmax+1, returns from the subscriber are monitored by the computing system to identify if Nout should be decremented.

4. The method of claim 1, wherein said machine readable media items are identified in a delivery queue by the subscriber using the computing system.

5. The method of claim 1, wherein said machine readable media items are digital versatile disks (DVDs) rented over an Internet connection.

6. The method of claim 1, further including a step: monitoring a delinquency period for the subscriber with the computing system, which delinquency period is a period of time in which Nout>=Nmax for the subscriber.

7. The method of claim 6, further including a step: preventing a delivery of another machine readable media item to the subscriber with the computing system when said delinquency period of time for the subscriber exceeds a threshold.

8. The method of claim 1, wherein said predetermined delay is a function of Nout.

9. The method of claim 1, wherein said predetermined delay is a function of when a prior title was delivered to the subscriber.

10. The method of claim 1, wherein said predetermined delay is a function of a demand determined by the computing system for said machine readable media item.

11. A method of delivering rented machine readable media to a subscriber comprising the steps of:
providing a maximum number of machine readable media items (Nmax) which the subscriber can have out at any moment in time;
wherein Nmax is identified by a computing system interacting with the subscriber;
delivering a machine readable media item to the subscriber in accordance with a priority specified by the subscriber to the computing system;
incrementing a count of machine readable media items out (Nout) at the computing system;
determining if Nout>=Nmax at the computing system;
determining if an overcapacity triggering event has occurred at the computing system; and
after determining that such overcapacity triggering event has occurred, delivering another machine readable media item to the subscriber after a predetermined delay even if Nout>=Nmax;
wherein a number of machine readable media items in excess of Nmax can be in the subscriber's possession and/or in transit to/from the subscriber.

12. The method of claim 11, wherein said overcapacity triggering event is a promotion for said another machine readable media item.

13. The method of claim 11, wherein said overcapacity triggering event is based on a demand determined by the computing system to be associated for said another machine readable media item.

14. The method of claim 11, wherein said overcapacity triggering event is based on a timer associated with the subscriber.

15. The method of claim 11, wherein said overcapacity triggering event is based on a recommender system prediction given for the subscriber.

16. The method of claim 11, wherein said overcapacity triggering event is based on monitoring a status of machine readable media items in a delivery queue maintained for the subscriber at the computing system.

17. A method of delivering rented machine readable media to a subscriber comprising the steps of:
providing a maximum number of machine readable media items (Nmax) which the subscriber can have out at any moment in time;
delivering a first machine readable media item to the subscriber;
monitoring returns from the subscriber and a delivery capacity for the subscriber with a computing system to identify if a second machine readable media item should be sent to the subscriber;
selecting at least two candidate machine readable media items with the computing system by choosing a first title identified by the subscriber in a first session with the computing system as a title to be delivered next in sequence and a second title automatically selected for the subscriber by the computing system after said first session based on preferences of the subscriber; and
presenting said at least two candidate machine readable media items to the subscriber with the computing system to permit such subscriber to select which one should be delivered next in sequence;
wherein the subscriber is consulted before said second machine readable media item is sent.

18. The method of claim 17, wherein the subscriber is consulted by email.

19. The method of claim 17, wherein the subscriber is directed to a website to select from additional candidate media items.

20. The method of claim 17, wherein the second title is selected by a recommender system operating at an Internet site.

21. A method of delivering rented machine readable media to a subscriber of a media rental service comprising the steps of:
(a) providing a maximum number of machine readable media items (Nmax) which the subscriber can have out at any moment in time from the media rental service;
(b) delivering a first machine readable media item from the media rental service to the subscriber;
(c) monitoring returns from the subscriber with a computing system to identify if a second machine readable media item should be sent to the subscriber based on capacity available in a subscriber delivery queue;
(d) presenting said second machine readable media item to the subscriber after step (c) with the computing system to permit such subscriber to review said second machine readable before it is actually sent from the media rental service; and (e) delivering said second machine readable media item to the subscriber based on a delay of a first time period after step (c) so that said second machine readable media item is automatically shipped from the media rental service only after said first time period expires;

wherein said delay is imposed by an inventory management system based at least in part on demand for said second machine readable media item.

22. The method of claim 21, wherein said delay is only imposed by the computing system on selective subscribers, based on monitoring usage of said media items by said selective subscribers.

23. The method of claim 21, wherein said first time period is 1 day or more.

24. The method of claim 21, further including a step: allowing the subscriber to modify or prevent said delivery of said second machine readable media item using the computing system before said first time period expires.

25. The method of claim 21, further including a step: sending a third machine readable media item to another subscriber without imposing a delay, which third machine readable media item is ranked higher by the subscriber and has a higher demand than said second machine readable media item, as determined by the computing system based on comparing media item usage characteristics of said subscriber and said another subscriber.

26. A method of delivering rented machine readable media to subscribers of a media rental service comprising the steps of:

(a) providing a maximum number of machine readable media items (Nmax) which the subscribers can have out at any moment in time from the media rental service;

(b) identifying a demand characteristic with a computing system for a first machine readable media item requested by both a first subscriber and a second subscriber;

(c) monitoring returns from the first subscriber and second subscriber with the computing system to identify if said first machine readable media item should be sent to one or both of such subscribers based on capacity available in their respective subscriber delivery queues; and (d) delivering said first machine readable media to said first subscriber based on said demand characteristic and comparing media usage behavior of said first subscriber and said second subscriber, including determining an allotment of titles received by said first subscriber and said second subscriber from the media rental service during a prior period.

27. The method of claim 26, further comprising a step: sending a second machine readable media item to said second subscriber, which second machine readable media item has a demand characteristic determined by the computing system to be less than said first machine readable media item.

28. The method of claim 27, wherein said second machine readable media is sent only after a delay of a first time period expires.

29. The method of claim 28, wherein said delay is only imposed for a selective group of subscribers determined by the computing system.

30. The method of claim 27, wherein after step (e) the subscriber has a number of machine readable media items which exceeds Nmax.

31. The method of claim 30, wherein said delay is imposed for a selective group of machine readable media items which are high demand items determined by the computing system.

* * * * *